US007725933B2

(12) United States Patent
Fascenda

(10) Patent No.: US 7,725,933 B2
(45) Date of Patent: May 25, 2010

(54) AUTOMATIC HARDWARE-ENABLED VIRTUAL PRIVATE NETWORK SYSTEM

(75) Inventor: Anthony C. Fascenda, North Bethesda, MD (US)

(73) Assignee: Koolspan, Inc., Bethesda, MD (US)

( * ) Notice: Subject to any disclaimer, the term of this patent is extended or adjusted under 35 U.S.C. 154(b) by 1068 days.

(21) Appl. No.: 11/001,123

(22) Filed: Dec. 2, 2004

(65) Prior Publication Data
US 2005/0188194 A1     Aug. 25, 2005

Related U.S. Application Data

(63) Continuation-in-part of application No. 10/679,371, filed on Oct. 7, 2003.

(60) Provisional application No. 60/526,123, filed on Dec. 2, 2003.

(51) Int. Cl.
    *G06F 12/14*     (2006.01)
(52) U.S. Cl. ....................................................... 726/17
(58) Field of Classification Search ................... 726/17
See application file for complete search history.

(56) References Cited

U.S. PATENT DOCUMENTS

| | | | |
|---|---|---|---|
| 5,768,382 A | 6/1998 | Schneier et al. | |
| 6,304,658 B1 | 10/2001 | Kocher et al. | |
| 6,397,328 B1 | 5/2002 | Pitchenik et al. | |
| 6,526,264 B2 | 2/2003 | Sugar et al. | |
| 6,571,221 B1 | 5/2003 | Stewart et al. | |
| 6,611,821 B2 | 8/2003 | Stahl et al. | |
| 6,643,781 B1 | 11/2003 | Merriam | |
| 6,657,981 B1 | 12/2003 | Lee et al. | |
| 6,895,502 B1* | 5/2005 | Fraser ........................ 713/168 |
| 2001/0048744 A1 | 12/2001 | Kimura | |

(Continued)

OTHER PUBLICATIONS

Bruce Potter, "Wireless Security's Future," On the Horizon IEEE, 2003, pp. 68-72.

(Continued)

*Primary Examiner*—Brandon S Hoffman
(74) *Attorney, Agent, or Firm*—Hunton & Williams LLP

(57) ABSTRACT

The present invention provides a technique for automatically establishing efficient, remote, secure client connections to one or more locations using a smart card enabled client driver and a smart card enabled network edge device ("Subnet Box") capable of establishing an end-to-end hardware encrypted tunnel between itself and the client. In an embodiment of the invention, a method of establishing a secure communications tunnel comprises the steps of: authenticating a remote client to a subnet box on a private network, wherein the remote client is connected to the subnet box via a public network, establishing a tunnel between the remote client and the subnet box, and encapsulating all traffic in the tunnel, wherein the tunnel is established only when a unique physical token is coupled to the remote device. The unique physical token comprises a smartcard and is configured to be inserted into a communications port of the remote device. The step of authenticating comprises the steps of: receiving an authentication packet, wherein the first authentication packet comprises an identifier identifying the unique physical token and a first random number, and transmitting a response authentication packet, wherein the response authentication packet comprise a second random number. The step of establishing a secure communications tunnel comprises the step of generating a cryptographic key based on the first and second random numbers.

11 Claims, 16 Drawing Sheets

U.S. PATENT DOCUMENTS

| | | |
|---|---|---|
| 2001/0054147 A1 | 12/2001 | Richards |
| 2002/0021665 A1 | 2/2002 | Bhagavath et al. |
| 2002/0029350 A1 | 3/2002 | Cooper et al. |
| 2002/0129143 A1 | 9/2002 | McKinnon, III et al. |
| 2002/0157090 A1 | 10/2002 | Anton, Jr. |
| 2002/0169712 A1 | 11/2002 | Ginzboorg et al. |
| 2003/0041091 A1 | 2/2003 | Cheline et al. |
| 2003/0041244 A1 | 2/2003 | Buttyan et al. |
| 2003/0051140 A1 | 3/2003 | Buddhikot et al. |
| 2003/0070067 A1 | 4/2003 | Saito |
| 2003/0070084 A1 * | 4/2003 | Satomaa et al. ............ 713/200 |
| 2003/0093680 A1 | 5/2003 | Astley et al. |
| 2004/0023639 A1 | 2/2004 | Noel, Jr. |
| 2004/0203590 A1 | 10/2004 | Shteyn |
| 2005/0010680 A1 | 1/2005 | Zick et al. |
| 2005/0050352 A1 * | 3/2005 | Narayanaswami et al. .. 713/201 |

OTHER PUBLICATIONS

John Cox, "Vendors Offer Tools To Control Secure WLANs," Network World, Jun. 7, 2004; 21 23; ABIINFORM Global, p. 24.

Miguel Bravo-Escos, "Networking Gets Personal," IEEE Review, Jan. 2002, pp. 32-36.

* cited by examiner

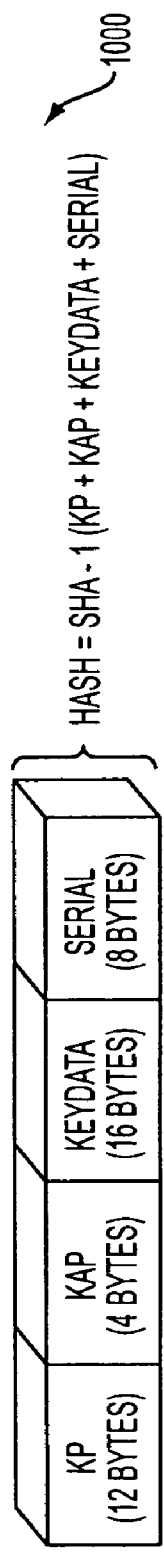

KAP::AUTHREQUEST DATA::HASH FIELD
THE HASH FIELD IS CREATED BY SHA-1 HASHING THE KOOLSPAN PROTOCOL (KP), THE KOOLSPAN AUTHENTICATION PROTOCOL (KAP), AS WELL AS THE KEYDATA AND SERIAL FIELDS BEFORE ENCRYPTION WITH THE NKS KEY.

| KP (12 BYTES) | KAP (4 BYTES) | KEYDATA (16 BYTES) | SERIAL (8 BYTES) |

HASH = SHA-1 (KP + KAP + KEYDATA + SERIAL)

REMOTE CLIENT CONNECTION TABLE

| REMOTE CLIENT IP ADDRESS/SOURCE PORT NO | LOCAL IP ADDRESS | AES SESSION KEY |
|---|---|---|
| 38.47.75.120:1580 | 192.168.0.101 | 07B456E9A04509FC1A2291 |
| 74.29.157.190:1901 | 192.168.0.102 | 509FC1A56E907B22E9A043 |

FIG. 10

AUTOMATIC HARDWARE-ENABLED VIRTUAL PRIVATE NETWORK SYSTEM

CROSS-REFERENCE TO RELATED APPLICATIONS

This instant application claims priority to U.S. Provisional Application No. 60/526,123 filed on Dec. 2, 2003, the disclosure of which is incorporated herein by reference in its entirety, and is a continuation-in-part application of U.S. patent application Ser. No. 10/679,371, entitled "Localized Network Authentication and Security Using Tamper-Resistant Keys," filed Oct. 7, 2003, the disclosure of which is incorporated herein by reference in its entirety. The instant application is also related to copending U.S. patent application Ser. No. 10/679,268, entitled "Shared Network Access Using Different Access Keys," filed Oct. 7, 2003; copending U.S. patent application Ser. No. 10/679,472, entitled "Self-Managed Network Access Using Localized Access Management," filed Oct. 7, 2003; and copending U.S. patent application Ser. No. 10/935,123, entitled "Subnet Box," filed Sep. 8, 2004, the disclosures of which are all incorporated by reference in their entirety.

BACKGROUND OF THE INVENTION

1. Field of the Invention

The present invention relates to wireless networking, and more particularly, to an automatic hardware-enabled virtual private network technique.

2. Description of Related Art

A Wireless Local Area Network (WLAN) is generally implemented to provide local connectivity between a wired network and a mobile computing device. In a typical wireless network, all of the computing devices within the network broadcast their information to one another using radio frequency (RF) communications. WLANs are based on the Institute of Electrical and Electronic Engineers (IEEE) 802.11 standard, which designates a wireless-Ethernet specification using a variety of modulation techniques at frequencies generally in the 2.4 gigahertz (GHz) and 5 GHz license-free frequency bands.

The IEEE 802.11 standard ("Wi-Fi"), the disclosure of which is incorporated herein in its entirety by reference, enables wireless communications with throughput rates up to 54 Mbps. Wi-Fi (for "wireless fidelity") is essentially a seal of approval certifying that a manufacturer's product is compliant with IEEE 802.11. For example, equipment carrying the "Wi-Fi" logo is certified to be interoperable with other Wi-Fi certified equipment. There are Wi-Fi compatible PC cards that operate in peer-to-peer mode, but Wi-Fi usually incorporates at least one access point, or edge device. Most access points have an integrated Ethernet controller to connect to an existing wired-Ethernet network. A Wi-Fi wireless transceiver connects users via the access point to the rest of the LAN. The majority of Wi-Fi wireless transceivers available are in Personal Computer Memory Card International Association (PCMCIA) card form, particularly for laptop, palmtop, and other portable computers, however Wi-Fi transceivers can be implemented through an Industry Standard Architecture (ISA) slot or Peripheral Component Interconnect (PCI) slot in a desktop computer, a Universal Serial Bus (USB), or can be fully integrated within a handheld device.

Users accessing data networks remotely often do so without security. This is particularly the case when a corporate user accesses his corporate Local Area Network (LAN) from a public hotspot. Most hotspots provide no security across the wireless link. This makes it mandatory to employ an external method of providing security to avoid confidential data being eavesdropped by unauthorized users. Typically, users desiring a secure connection to their corporate LAN employ a Virtual Private Network (VPN) solution. A VPN solution uses a special application on the user's computer and typically a VPN-Server strategically located on the corporate LAN. VPNs provide an end-to-end security solution regardless of the equipment or network components between the user's computer and the corporate network. VPNs however are slow and cumbersome and absorb a good portion of the available bandwidth. Client-side VPNs however, support only a single connection, that is, a connection between the user and the corporate LAN. A user desiring a second simultaneous connection would have to run a second VPN application to connect to a second location.

SUMMARY OF THE INVENTION

The present invention overcomes these and other deficiencies of the prior art by automatically establishing efficient, remote, secure client connections to one or more locations using a smart card enabled client driver and a smart card enabled network edge device ("Subnet Box') capable of establishing an end-to-end hardware encrypted tunnel between itself and the client.

In an embodiment of the invention, an automatic hardware-enabled virtual private network system comprises: a first token, wherein the first token is configured to be coupled to a computing device, a subnet box, and a key database, wherein the key database comprises a serial number and a secret cryptographic key associated with the token. The computing device is connected to the subnet box via a public network, the subnet box is a node on a private network, and the subnet box facilitates a virtual private network connection between the private network and the computing device when the first token is coupled to the computing device. The system further comprises a second token, wherein the second token is configured to be coupled to the subnet box. The virtual private network is facilitated only when the second token is coupled to the subnet box. The subnet box further comprises a dynamic host configuration protocol server. The first token comprises the serial number and the secret cryptographic key. The subnet box can authenticate the first token.

In another embodiment of the invention, a method of establishing a secure communications tunnel comprises the steps of: authenticating a remote client to a node on a private network, wherein the remote client is connected to the node via a public network, establishing a tunnel between the remote client and the node, and encapsulating all traffic in the tunnel, wherein the tunnel is established only when a unique physical token is coupled to the remote device. The unique physical token comprises a smartcard. The physical token is configured to be inserted into a communications port of the remote device. The step of authenticating comprises the steps of: receiving an authentication packet, wherein the first authentication packet comprises an identifier identifying the unique physical token and a first random number, and transmitting a response authentication packet, wherein the response authentication packet comprise a second random number. The step of establishing a secure communications tunnel comprises the step of generating a cryptographic key based on the first and second random numbers.

An advantage of the present invention is that it provides a technique for remote, secure access without requiring a VPN client application program or an enterprise VPN server. Another advantage of the invention is that it provides a technique to establish mutual authentication and an AES session key between the client and the remote network. Another advantage of the invention is that it establishes an efficient Layer 2 encryption process between two nodes. Yet another advantage of the invention is that it establishes and maintains a secure connection resulting in a virtual presence on the local network achieving all the benefits of a local connection.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which:

FIGS. 9 and 10 illustrate an authentication request data packet according to an embodiment of the invention;

DETAILED DESCRIPTION OF THE PREFERRED EMBODIMENTS

Figure 1:
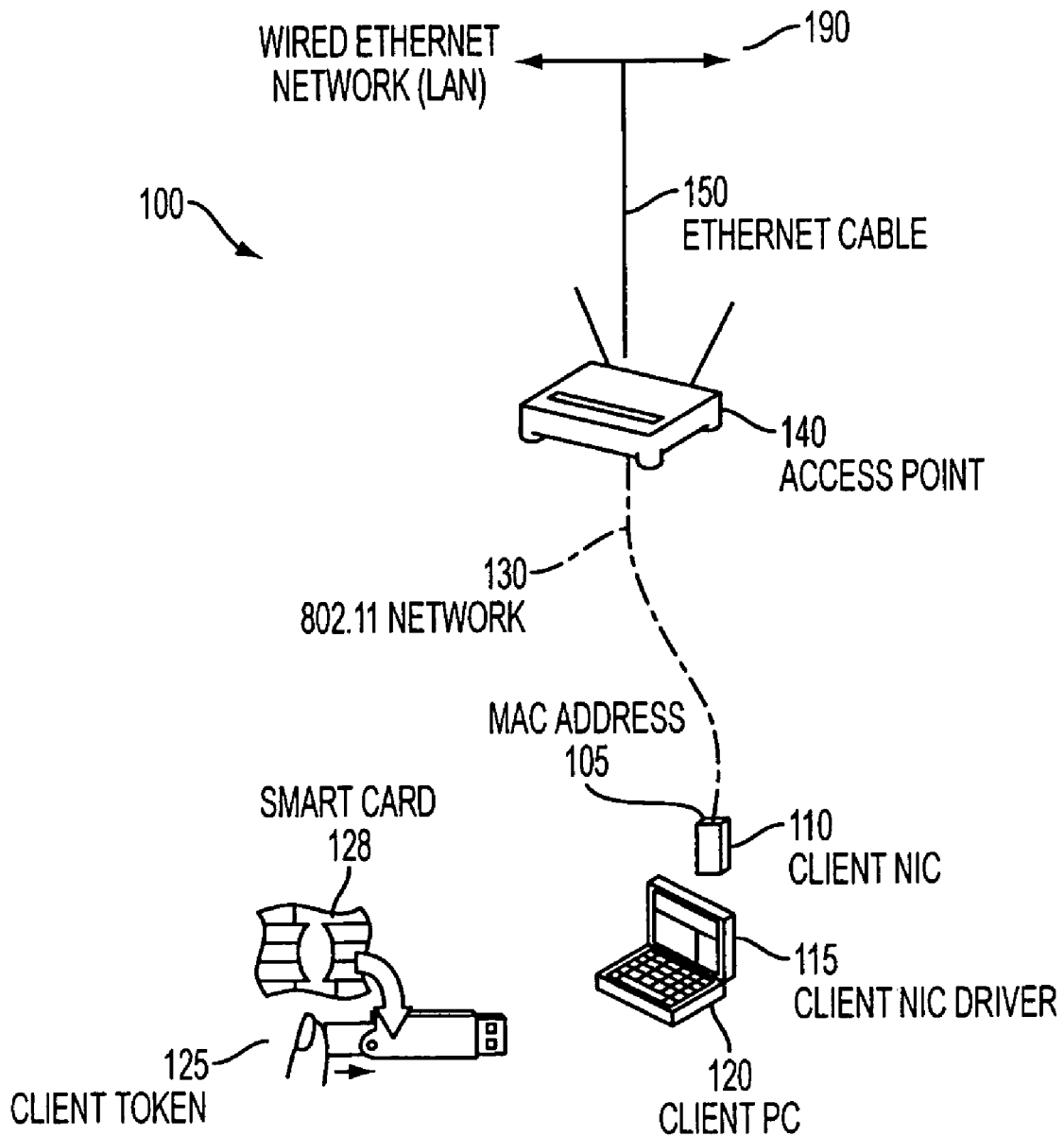
FIG. 1 illustrates an 802.11(x) wireless network service provider system according to an embodiment of the invention.

Preferred embodiments of the present invention and their advantages may be understood by referring to FIGS. 1-16, wherein like reference numerals refer to like elements, and are described in the context of an IEEE 802.11(x) ("Wi-Fi", wherein "x" denotes any of the various extensions of 802.11 such as "a", "b", or "g") wireless network operating in the public space for wireless subscribers. As would be readily apparent to those skilled in the art, the inventive techniques described herein are well suited for any type of wired and/or wireless communications protocol.

FIG. 1 illustrates an 802.11(x) wireless network service provider system (100) according to an embodiment of the invention. A client of the network system (100) employs a computing device (120), such as a laptop, having a wireless network interface card (NIC, 110). The NIC (110) enables communications over an 802.11(x) wireless network (130) between the computing device (120) and a network edge device (140), such as a network access point, which is connected to a wired network (190), such as an Ethernet network, via a wired connection (150), such as an Ethernet cable. The wired network (190) is preferably connected to the Internet, thereby permitting a client access to the Internet. A set of software drivers (115) is provided to interface the NIC (110) to the operating system of the client's computing device (120) and network protocols implemented over the network (130). The NIC (110) is addressed by a Media Access Control (MAC) address (105) or other unique identifier. One of ordinary skill in the art recognizes that the wireless network service provider system (100) can implement more than one network edge device (140), thereby enabling multiple hotspots. Although not shown, the system (100) can facilitate multiple clients (120).

Each client (120) is provided with a physical token (125) ("client token") comprising an integrated circuit (128) (or "smart card") or an appropriate cryptographically equipped hardware chip. The client token (125) is preferably configured such that it can be connected to the computing device (120) via a Universal Serial Bus (USB) interface. In alternative embodiments, the client token can take the form of an expansion card, PC card, Personal Computer Memory Card International Association (PCMCIA) cards, serial port hardware, parallel port hardware, or any other hardware configuration that can be coupled to the computing device (120). The client token (125) includes a pre-stored set of cryptographic keys that is never exposed to the client or to any network administrator. These pre-stored keys are used to encrypt data that is transferred from the client's computing device (120) to the network edge device (140) preferably in accordance with one or more techniques described in commonly owned and copending U.S. patent application Ser. Nos. 10/679,268, 10/679,371, and 10/679,472, the disclosures of which are incorporated herein by reference in their entirety. Nonetheless, one of ordinary skill in the art recognizes that other secure communications techniques can be implemented in alternative embodiments of the present invention. The smart card (128) can be selected from those available from a wide-variety of manufacturers and preferably is designed and manufactured according to standard International Standards Organization (ISO) specifications, e.g., ISO Specification 7816. In an exemplary embodiment of the invention, the smart card (128) is a Schlumberger Cryptoflex Card.

The smart card (128) is a key component of the authentication and secure communications technique(s) described in U.S. patent application Ser. No. 10/679,371. As described therein, the smart card (128) is employed to authenticate the corresponding client to the network edge device (140), which comprises its own smart card facilitated by a corresponding physical token (not shown) ("the network edge device token") coupled to the edge device (140). Each client token (125) and the network edge device token are identified by a uniquely assigned serial number. For example, the serial number can be an eight-byte field that is laser-etched or otherwise permanently inscribed into each token. While the serial number can be freely read, it cannot be changed. Each token can be further provided with a pin number that serves as a password to access and/or unlock the corresponding and underlying smart card during an initiation/installation process.

The client smart card (128) and the network edge device smart card store a set of network cryptographic keys comprising a Network Send Key ($NK_S$), a Network Receive Key ($NK_R$), and a Subscriber Secret Key ($NK_{UIDS}$) (collectively, referred to as "the Network Keys"). The Network Send Key is used to encrypt communications from the client PC (120) to the network edge device (140). The Network Receive Key is used to decrypt communications received by the client PC (120) from the network edge device (140). The Network Send Key and the Network Receive Key are common to all clients of the wireless network service provider system (100) or a particular network edge device (140). Generally, the Subscriber Secret Key ("Secret Cryptographic Key") is uniquely assigned to each client token (125). Moreover, a client smart card (128) may comprise multiple sets of Network Keys corresponding to a number of different wireless network service provider systems and/or network edge devices. For instance, the client may be authorized to access a number of independently operated wireless networks. A more detailed explanation of the generation of the above-identified keys is provided in commonly owned U.S. patent application Ser. Nos. 10/679,268, 10/679,371, and 10/679,472.

The present invention allows a client to plug in his client token (125) into his client device (120) and automatically establish secure connections to multiple remote networks simultaneously. This might be useful, for instance, when the client uses a hotspot to connect to his home network, office network, and a financial services network. A conventional Virtual Private Network (VPN) cannot establish multiple secure end-to-end connections simultaneously. To do so, multiple VPNs would have to be employed, wherein each VPN connection requires a dedicated VPN client application. Worse, VPN clients use an encryption technology that can result in 192 bytes out for every 32 bytes in, thereby wasting valuable bandwidth. In an embodiment of the present invention, an Advanced Encryption Standard (AES) algorithm is employed such that the encryption is lossless, i.e., for every 32 bytes in, you get 32 bytes out. Corporations would benefit greatly from the implementation of such an algorithm in remote networking. The embodiments described herein provide a VPN-like connection that is up to six-times more efficient than conventional VPN systems.

Figure 2:
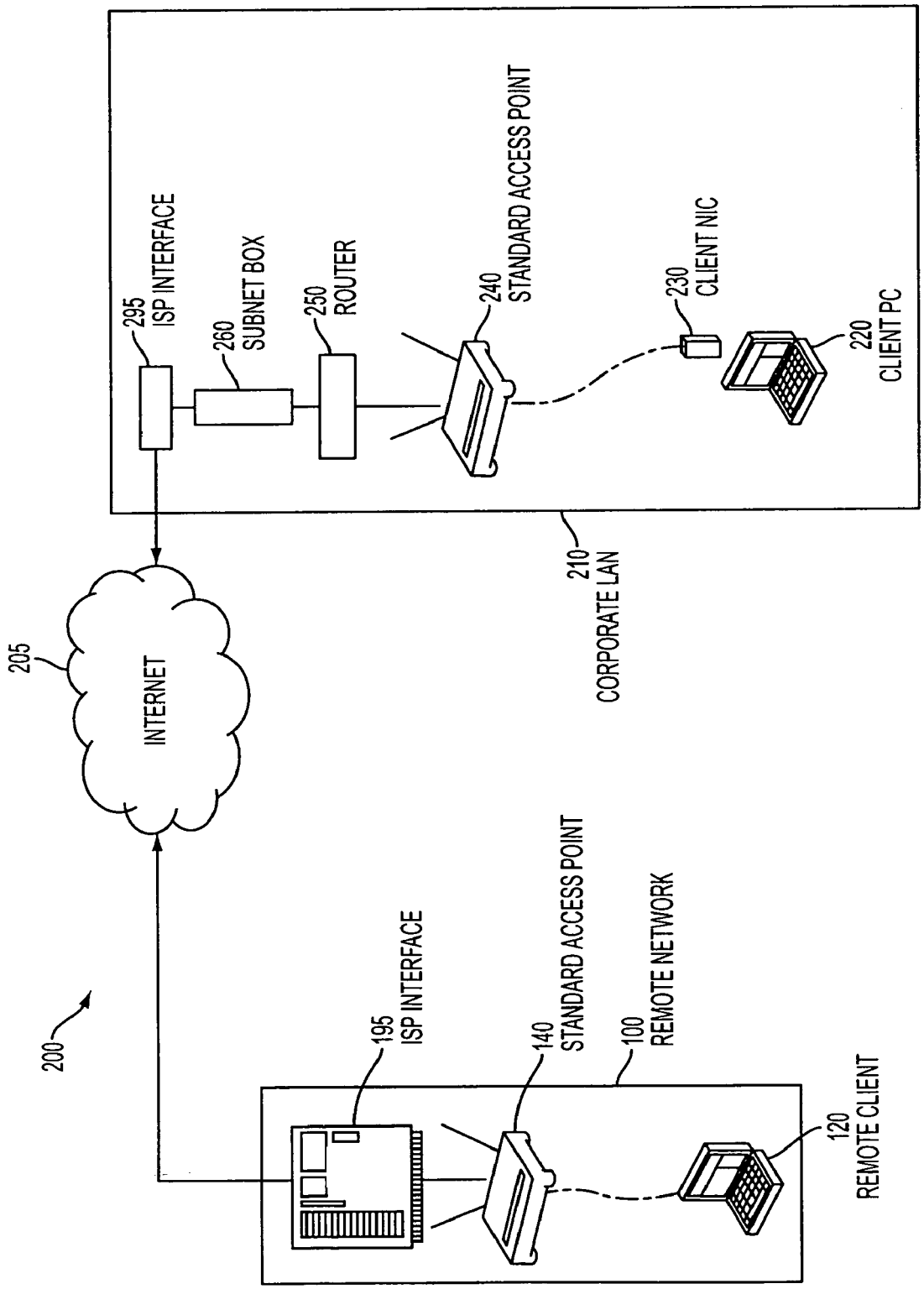
FIG. 2 illustrates remote access system according to an embodiment of the invention.

FIG. 2 illustrates a remote access system (200) according to an embodiment of the invention. Particularly, the remote access system (200) comprises the network (100) and a corporate LAN (210) connected to one another via a public network (205), such as the Internet. A remote connection is made between the remote client (120) and the corporate LAN (210) using, for example, a Transmission Control Protocol/Internet Protocol (TCP/IP) connection, the implementation of which is apparent to one of ordinary skill in the art, facilitated through an Internet Service Provider (ISP) interface (195) on the remote end. As will be described in greater detail, a smart card-enabled device manages each end of the connection.

In a typical configuration, the corporate LAN (210) comprises an ISP interface (295) to the Internet to which various internal devices of the corporate LAN are attached such as a router (250), a wireless Access Point (240), and one or more client PCs (220) connected to the access point (240) via a client NIC (230). In an embodiment of the invention, the corporate LAN (210) provides remote security through the addition of a smart card (not shown) enabled Subnet Box (260) strategically placed between the ISP Interface (295) and the router (250).

Figure 3:
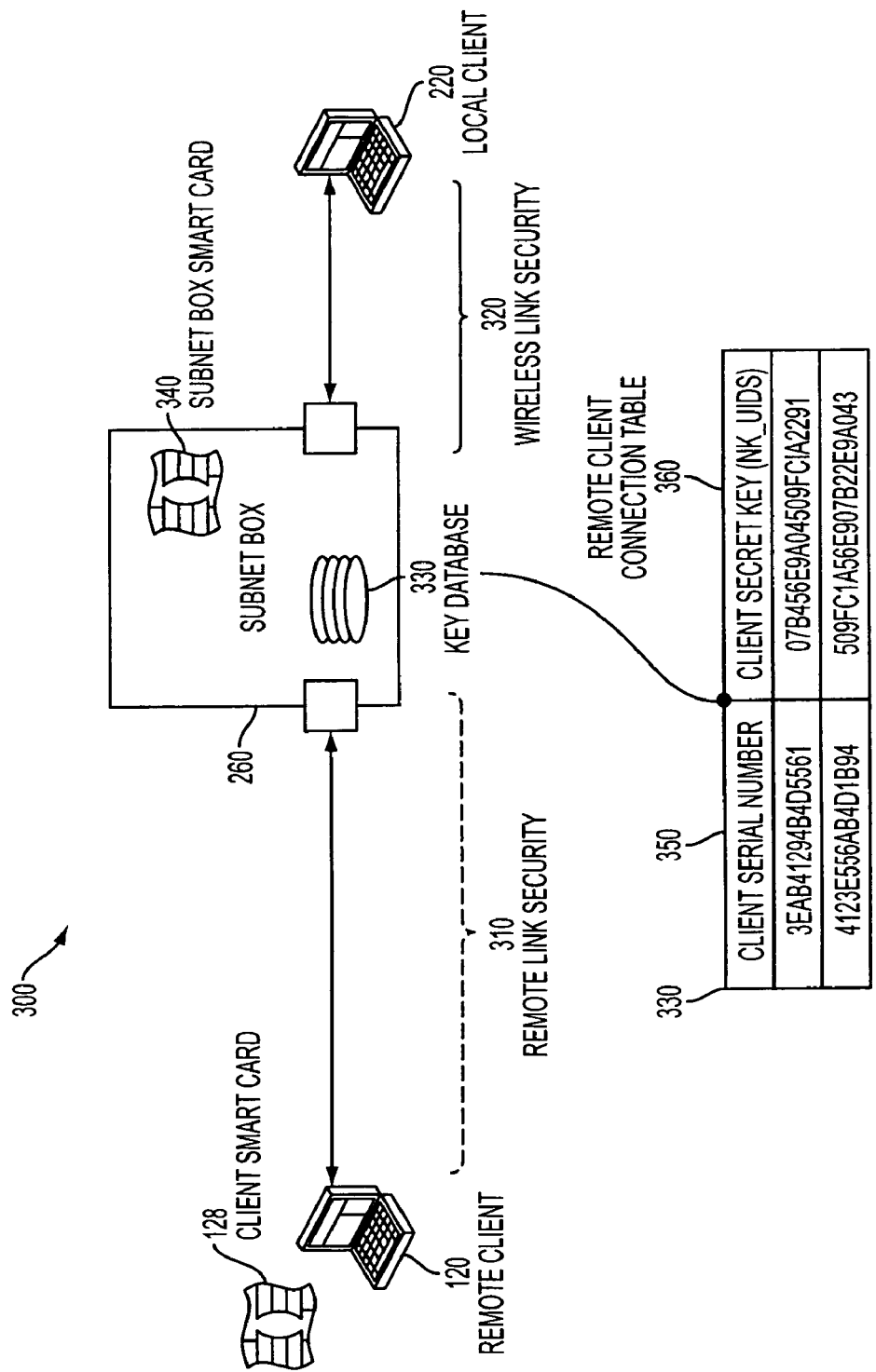
FIG. 3 illustrates a Subnet Box security system according to an embodiment of the invention.

FIG. 3 illustrates a Subnet Box security system (300) according to an embodiment of the invention. In this system (300), the Subnet Box (260) provides wireless link security allowing local client PCs (220) to establish a secure link (320) between themselves and the Subnet Box (260) eliminating any possible security holes. General operation of the Subnet Box (260) is described in commonly owned U.S. patent application Ser. No. 10/935,123, filed Sep. 8, 2004, the entire disclosure of which is incorporated herein by reference. A remote secure link (310) is facilitated by the client's smart card (128) and the Subnet Box's smart card (340). The Subnet Box (260) comprises a key database (330) that stores a listing of all client smart card serial numbers (350) of authorized client tokens (e.g., client token (125), etc.) along with a listing of the client tokens' corresponding encrypted secret cryptographic keys (360). The key database (330) in the figure shows two serial numbers and secret cryptographic keys. This number is exemplary only. In practice, the number of serial numbers and corresponding secret cryptographic keys is equal to the number of client tokens that are authorized to use the corporate LAN (210).

Figure 4:
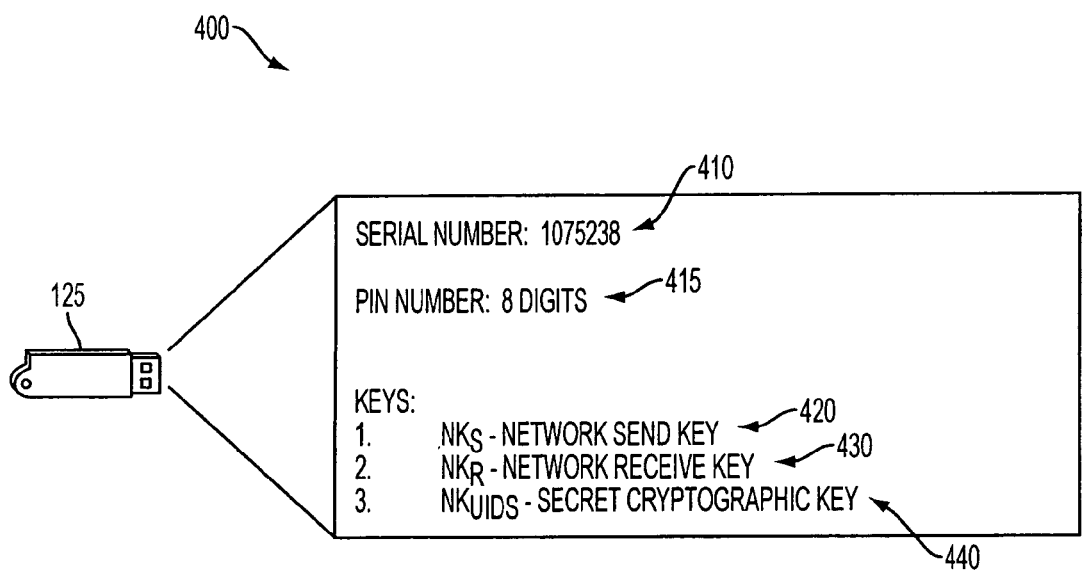
FIG. 4 illustrates elements of a client token according to an embodiment of the invention.

FIG. 4 illustrates elements (400) of the client token (125) according to an embodiment of the invention. As noted earlier, each client token (125) is identified with a uniquely assigned serial number (410), a PIN Number (415), a Network Send Key (420), a Network Receive Key (430) and a unique secret cryptographic key (440). When an entry is made into the key database (330) of the Subnet Box (260), the client's secret cryptographic key (440) is entered into the list (360) along with the corresponding serial number of the client into the list (350).

The Subnet Box (260) facilitates the remote security tunnel (310) between itself and the remote client (120) regardless of any intervening network components between the Subnet Box (260) and the remote client (120).

Figure 5:
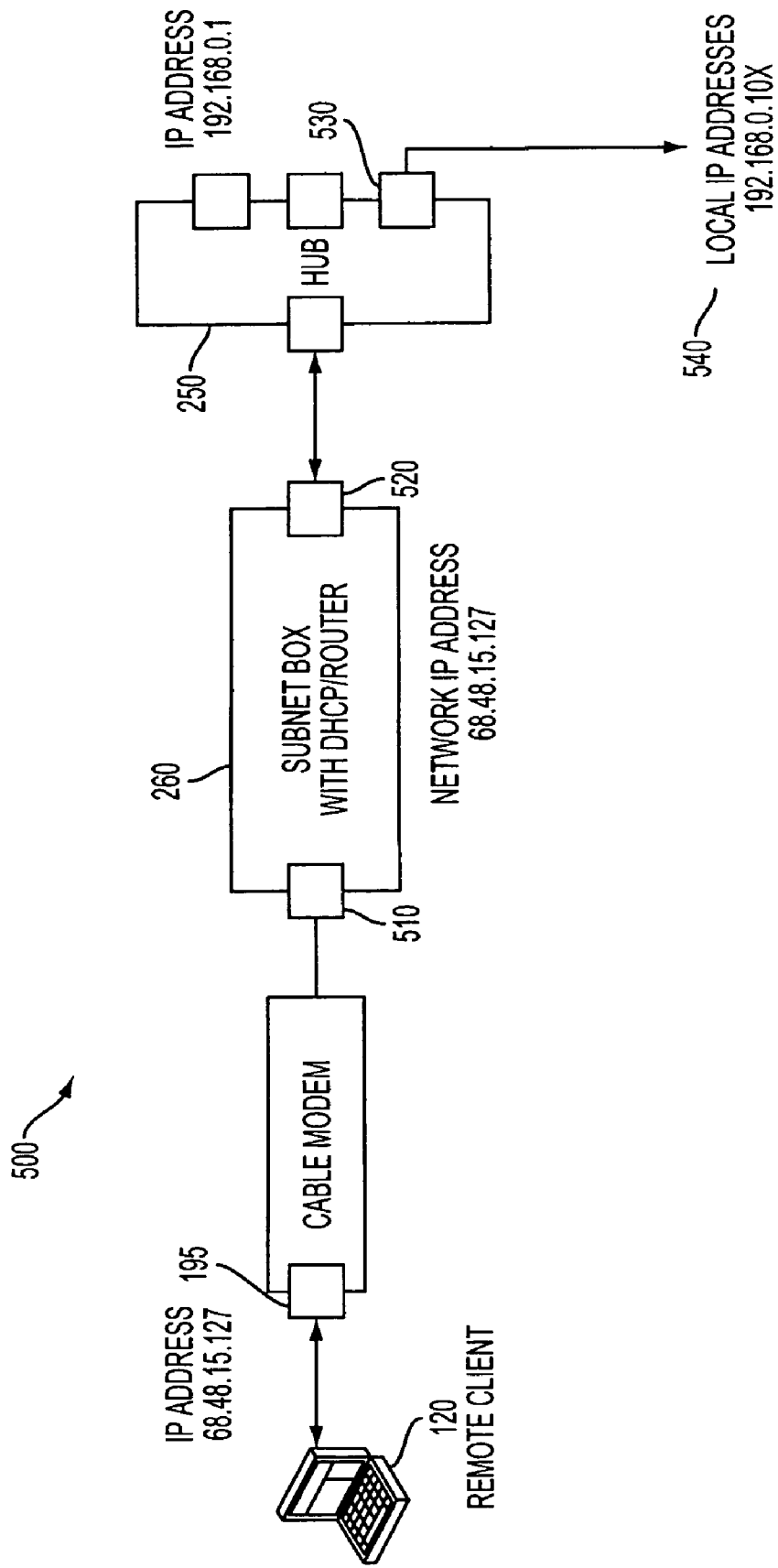
FIG. 5 illustrates a network connection according to an embodiment of the invention.

FIG. 5 illustrates a network connection (500) according to an embodiment of the invention. Here, the ISP interface (195) is represented as a cable modem (190). Other types of ISP interface such as Digital Subscriber Line (DSL) modem, LAN modem, and the like can be employed, the implementation of which is apparent to one of ordinary skill in the art, as an alternative to the cable modem. The cable modem (195) is typically provided with a dynamic IP address by the corresponding network of the cable ISP provider. The cable modem (195) operates as a bridge interface between the cable network and the client's network or in this case, as a bridge to the Subnet Box (260).

In an embodiment of the invention, the Subnet Box (260) provides capabilities of a Dynamic Host Configuration Protocol (DHCP) server and a router. Both the cable modem (195) and the Subnet Box (260) will see all packets addressed to the network IP Address of the cable modem (195). However, the Subnet Box (260) provides one or more internal addresses (540) to all local clients on the corporate network (210). More than one local network client can be attached to the network via a network hub (250) through a port (530) on the hub. The Subnet Box (260) is thus in a position to 'see' every IP packet addressed to the cable modem (195) on one side (510) and all LAN packets on the LAN side (520).

The process of providing an automatic, hardware-enabled VPN between the subnet box (260) and the remote client (120) comprises the following steps:
1. Authenticate the remote client (120) to the subnet box (260);
2. Establish an AES Session Key for a tunnel between the remote client (120) and the subnet box (260); and
3. Encapsulate all traffic in the tunnel.

Authentication

The process of establishing a remote, secure connection begins with the remote Client's PC (120).

Figure 6:
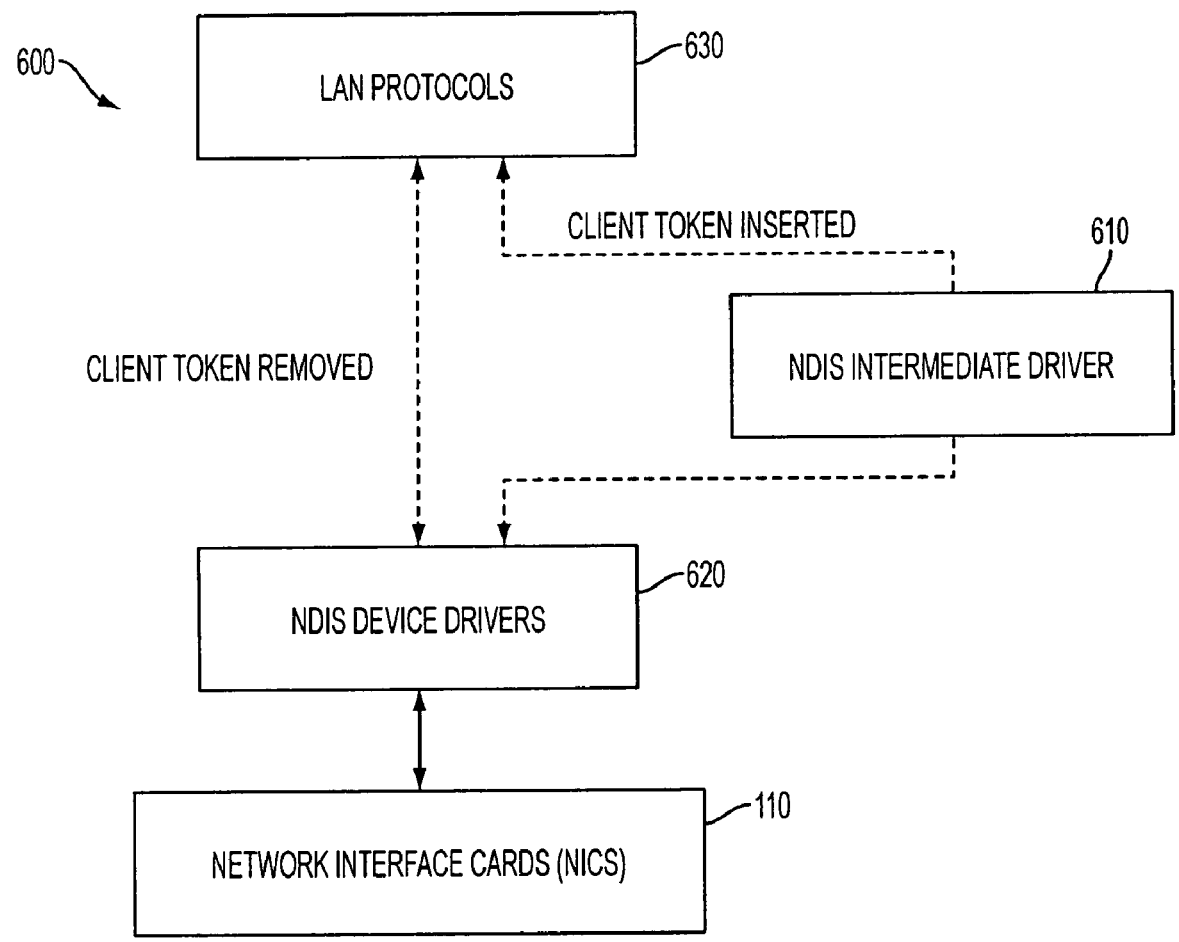
FIG. 6 illustrates a network driver interface system according to an embodiment of the invention.

Referring to FIG. 6, which illustrates a network driver interface system (600), a client implements a set of software drivers (115) comprising a Network Driver Interface Specification (NDIS) intermediate driver (610). The NDIS intermediate driver (610) is a software program that is implemented between the normal operating system, e.g., Windows, low-level device driver (620) and the LAN Protocols layer (630). When the client token (125) is coupled to the client's computing device (120), the NDIS Intermediate driver (610) intercepts all network bound and network originated packets. When the client token (125) is removed, the NDIS Intermediate Driver (610) has no effect on network traffic and typical NIC Device Drivers (110) are employed, the implementation of which is apparent to one of ordinary skill in the art. The NDIS Intermediate Driver (610) interfaces the NDIS Device Driver (620) to the Windows LAN Protocols (630) when the client token (125) is inserted into the client PC (120).

Figure 7:
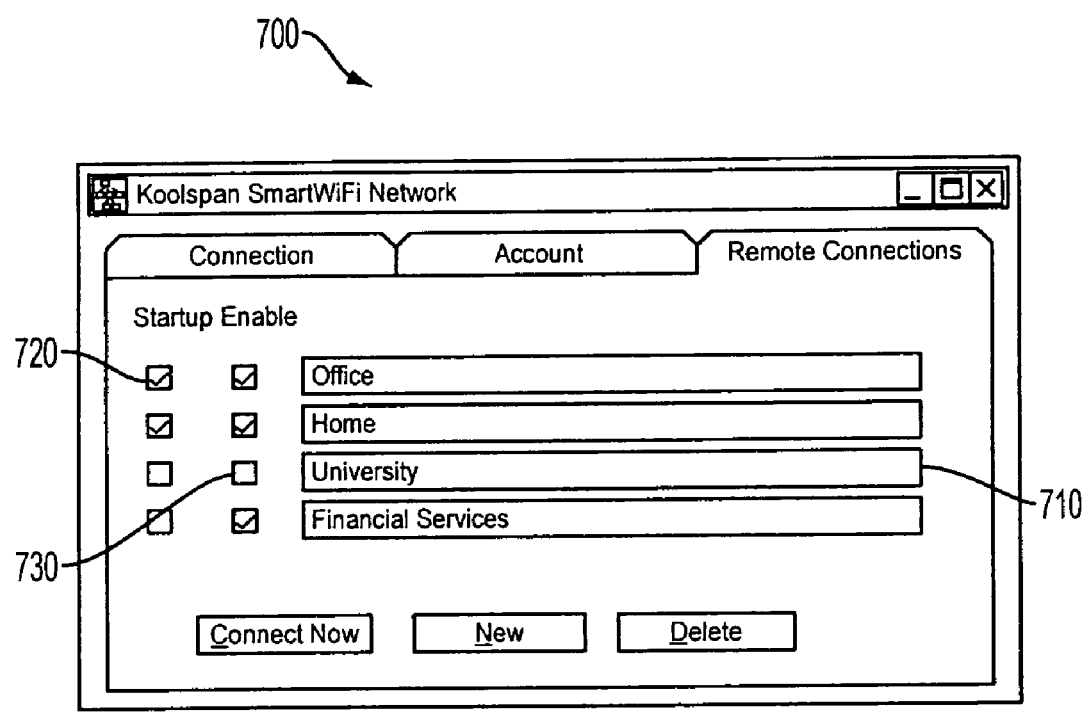
FIG. 7 illustrates a client interface according to an embodiment of the invention.

According to an embodiment of the invention, the client PC (120) is provided with a client interface, i.e., connection list, (700) as illustrated in FIG. 7. Here, the client can add new connections to the connection list (700) allowing automatic, secure remote connections to be made when the client token (125) is inserted. Each item in the list is further provided with a startup toggle (720) and an enable toggle (730) allowing the user to configure a list but limit which connections to be made at any particular time. Each individual remote connection (710) represents an IP address, Domain Name System (DNS) name of the remote network (100) or other unique identifier that can be used to obtain the current IP address of the remote network (100). One of ordinary skill in the art understands the meaning and use of either method of representation.

On insertion of the client's token (125), the NDIS Intermediate Driver (610) will scan the list of enabled remote network connections (730) as shown in the Remote Connections tab of the client interface (700). Beginning with the first enabled connection in the remote network connections tab and continuing to the last remote connection entry, the NDIS Intermediate Driver (610) will send a first authentication packet to the IP Address or DNS name of the remote connection (710).

Figure 8:
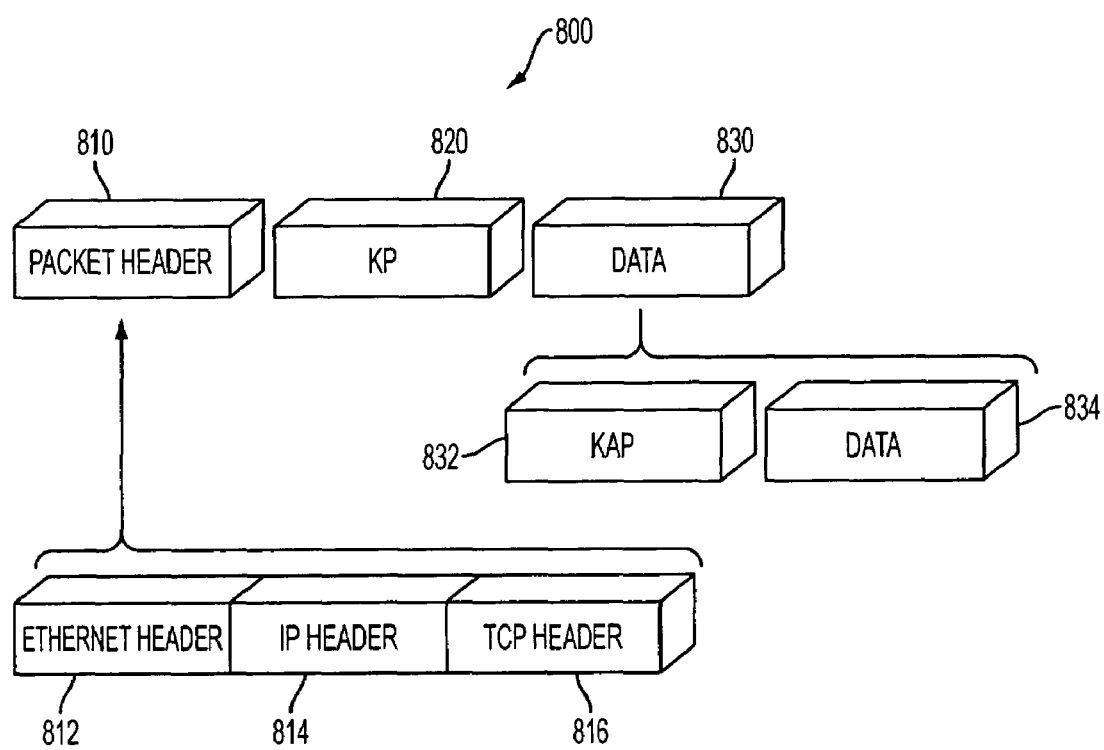
FIG. 8 illustrates an authentication protocol according to an embodiment of the invention.

FIG. 8 illustrates an authentication protocol (800) according to an embodiment of the invention. A packet header (810) comprises a standard Ethernet header (812), an IP header (814), and a TCP header (816). The IP header (814) contains the IP address of the remote network (100). The TCP Header (816) comprises the port number of the authentication process within the Subnet Box (260). This TCP/IP packet, which is sent by the remote client (120), will be received by the cable modem (195) and passed onto the Subnet Box (260) where it will be processed. The packet header (810) is followed by a protocol header (820) and followed again with appropriate data (830), which comprises an authentication protocol header (832) and an authentication request data packet (834). The authentication protocol header (832) conveys information such as the version and type of authentication protocol and a sequence number.

Figure 9:
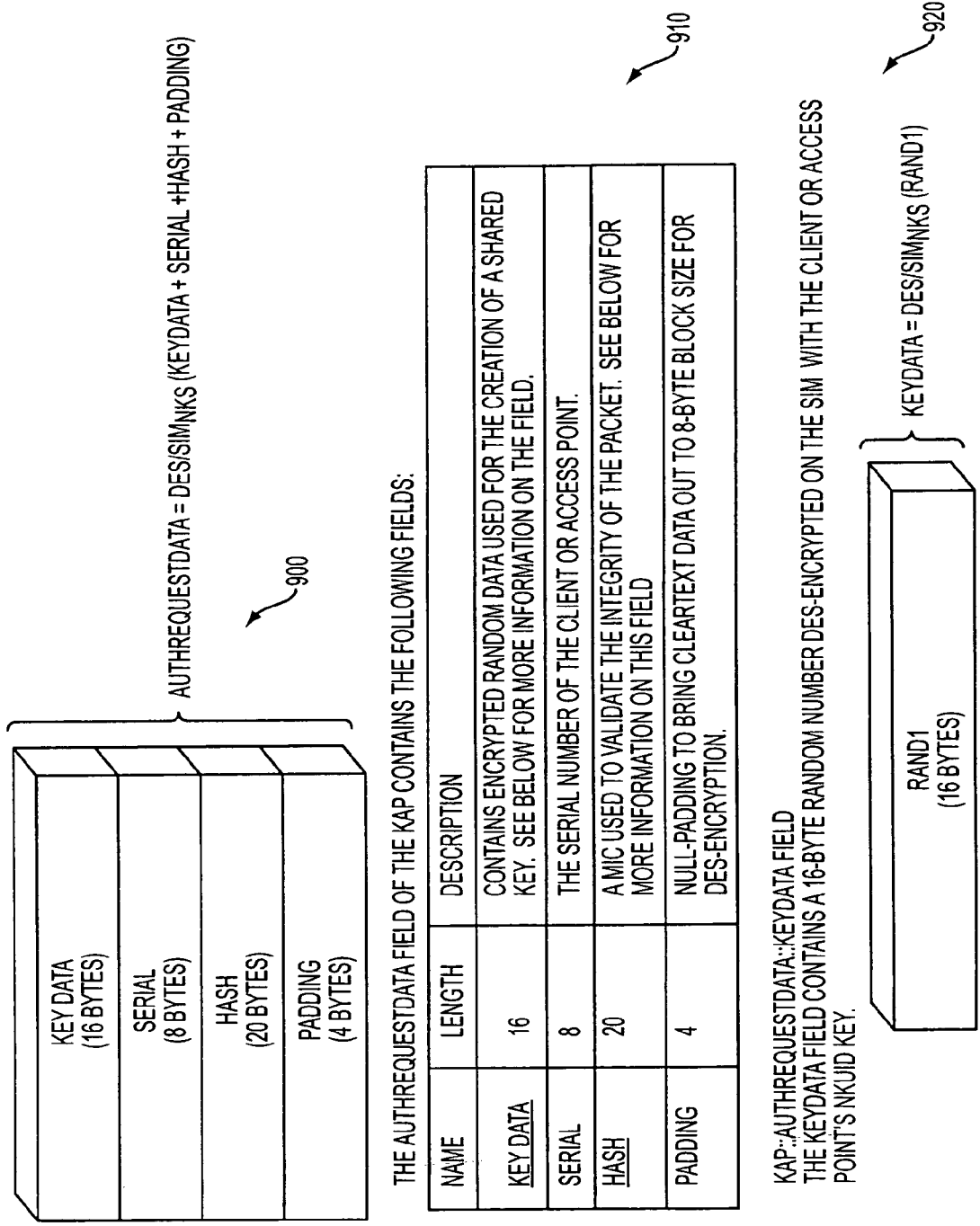

FIG. 9 illustrates authentication request data packet according to an embodiment of the invention. The authentication data (identified previously in data (834)) comprises a random number ("keydata") generated by the client token (125) and encrypted with the secret cryptographic key (440) (see 920). The breakdown of an "authRequestData" field of the authentication protocol header (832) is shown (see 910). The serial field contains the serial number (410) of the client token (125). A hash is computed to ensure the integrity of the packet when received by the Subnet Box (260) and is computed as shown in FIG. 10 (see 1000). The protocol header (820), authentication protocol header (832), keyData, and the serial number (410) is hashed to provide a signature of the data. The authRequestData field (900) comprises the keyData, the serial number (410), hash, and padding (see 900) all of which is encrypted by the Network Send Key (420) and transmitted to the Subnet Box (260).

On receipt of this packet, the Subnet Box (260) will process the packet to extract the serial number (410) of the client token (125). The Subnet Box (260) will first decrypt the authData (900) field recovering the encrypted keyData, the serial number (410), and hash. The serial number (410) will be used to extract the secret cryptographic key (440) from the key database (330) of the Subnet Box (260) if it exists. A hash is then computed as originally constructed (1000) and compared against the received hash. If they match, the authentication process continues, otherwise an error message is returned to the client (120).

Figure 11:
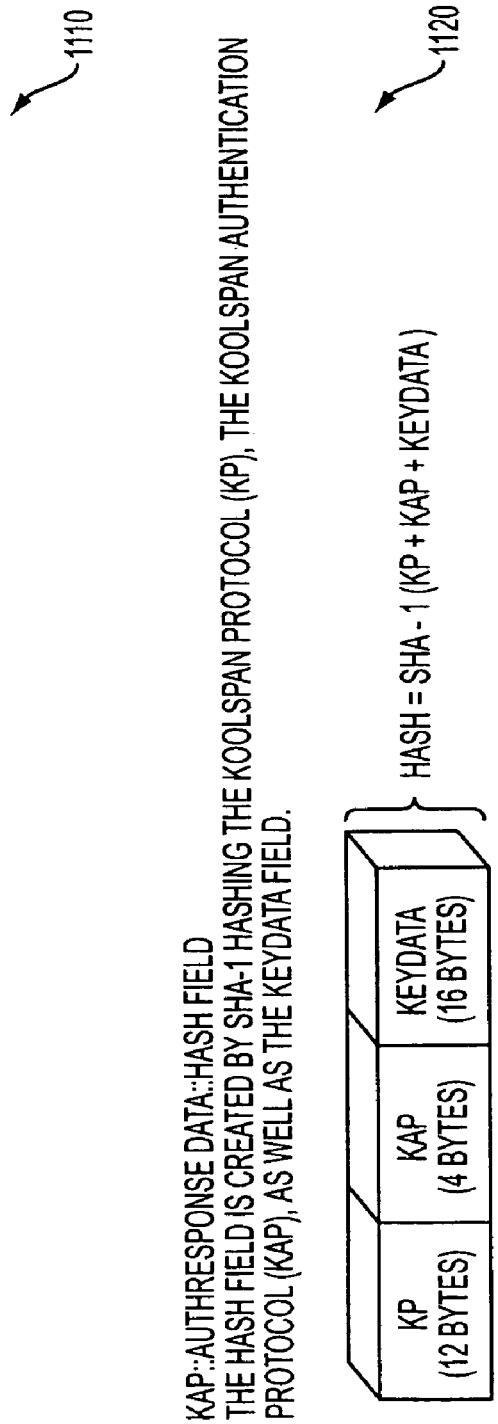
FIGS. 11 and 12 illustrates an authentication response packet according to an embodiment of the invention.
Figure 12:

FIG. 11 illustrates an authentication response packet according to an embodiment of the invention. The authentication response packet comprises a second random number generated by the Subnet Box (260) and encrypted with the client's secret cryptographic key (440) to form a keyData field (1110). A hash (1120) is computed to serve as an integrity check when the client (120) receives the response packet. Referring to FIG. 12, a status byte (1220) indicates the result of the authentication process. An "authResponseDatafield" (1210) comprises the encrypted keyData, status byte (1220), and hash (112) encrypted with the Network Send Key (420). The authentication response packet is formed identically to the format shown in FIG. 8 with the appropriate fields changed to indicate the proper sequence number, authType field (="response"), and the TCP/IP headers changed to reflect those of the client (120).

Establishing an AES Session Key

On receipt of the authentication response packet from the Subnet Box (260), the Client NDIS Intermediate Driver (610) processes the packet by decrypting the keyData field (1110) to recover the second random number generated by the Subnet Box (260) after checking the hash (1120) to make sure the packet was not tampered with during transmission.

Figure 13:
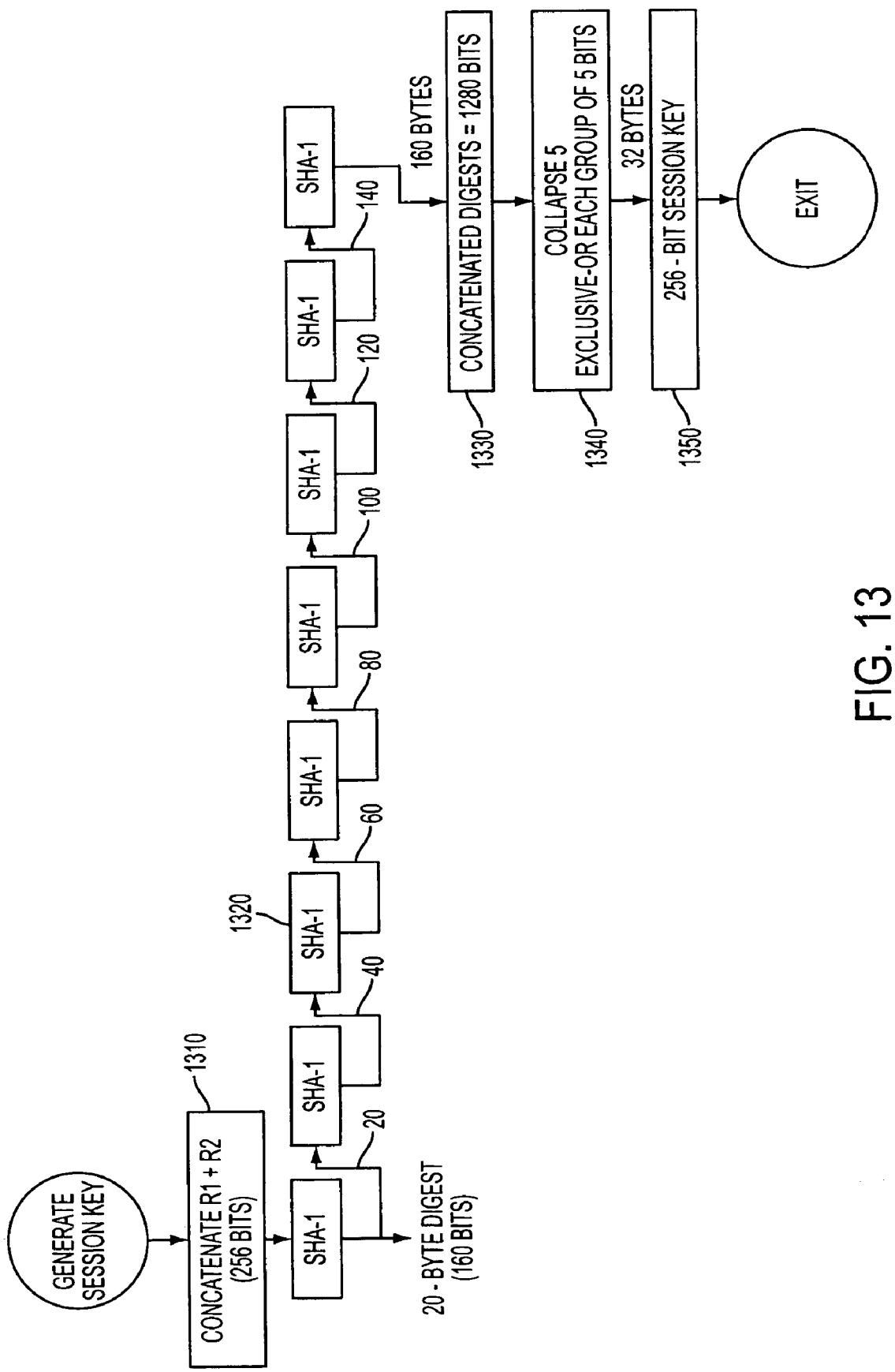
FIG. 13 illustrates generation of an AES Session Key according to an exemplary embodiment of the invention.

As both sides of the link (client and Subnet Box) know both random numbers, a base AES Session Key can be readily computed. FIG. 13 illustrates generation of an AES Session Key according to an exemplary embodiment of the invention. Particularly, the two 128-bit random numbers are concatenated (step 1310) and then hashed eight times (step 1320) resulting in a 1280-bit concatenated digest (step 1330). This digest is then collapsed by exclusive-or'ing each group of five bits (step 1340), thereby resulting in a 256-bit AES Session key (1350).

The AES Session Key (1350) is then associated with the IP address of the remote network (100). A table (1020) is maintained in the Client NDIS Intermediate Driver (610) mapping a remote IP address (1040) to an AES Session Key (1030). After authentication, all communications between the client (120) and the remote network employ the AES Session Key (1350) for encrypting/decrypting data.

The Subnet Box (260) will assign a local IP Address (1050) for the client PC (120) and complete the entry in the remote client connected table (1020). After authentication, any packet received by the remote client (120) is decrypted by the Subnet Box (260) and placed onto the local area network (LAN) with the local IP address (1050) substituted for the actual source IP Address (1040) of the Remote Client (120).

The Subnet Box (260) bridges any network packets received on the LAN side to the remote client (120) by substituting the Local IP Address (1050) for the network IP Address. Likewise, any packets received from the remote client PC (120) are bridged onto the LAN substituting the Local IP Address (1050) for the remote client PC Source IP Address (1040).

This remote/local translation, thus allows the remote Client PC (120) to appear virtually on the LAN and likewise allows the Remote Client PC (120) the ability to 'see' the LAN is if locally connected.

Similarly, the Subnet Box (260) will make a corresponding entry of the AES Session Key (1030) in its remote connection table (1020).

The process of authentication and establishing an AES Session Key is repeated for each additional enabled remote network connection (710) in the user interface: Remote Connections Tab (700).

When the user removes his token (125), all remote connections are programmatically disconnected and the Client's Remote Connection Table is cleared of all entries. The Subnet Box (260) at the remote network likewise will clear its entry for the matching IP Address and TCP Port of the Client. A similar process results if the Client un-checks the "Enable" checkbox of the Remote Connections Tab (700) for a particular remote connection (710).

Encapsulating Tunneled Traffic

Figure 14:
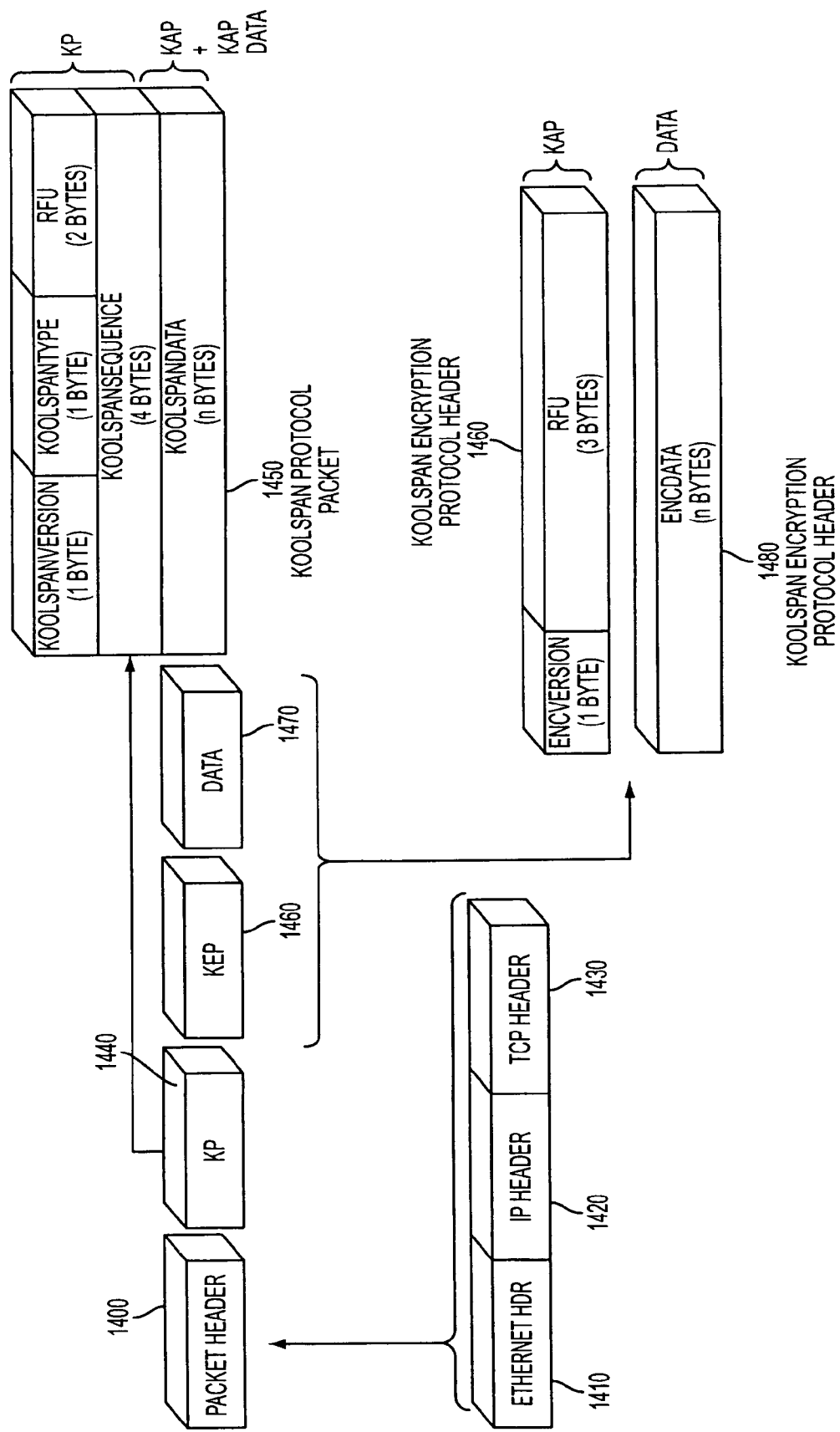
FIGS. 14 and 15 illustrate a protocol for encapsulating tunnel traffic according to an embodiment of the invention.

After establishing mutual authentication and generating an AES Session Key for use in communicating with a remote network, The Client NDIS Intermediate Driver (510), will encapsulate all outbound traffic to that IP address as shown in FIG. 14.

Figure 15:
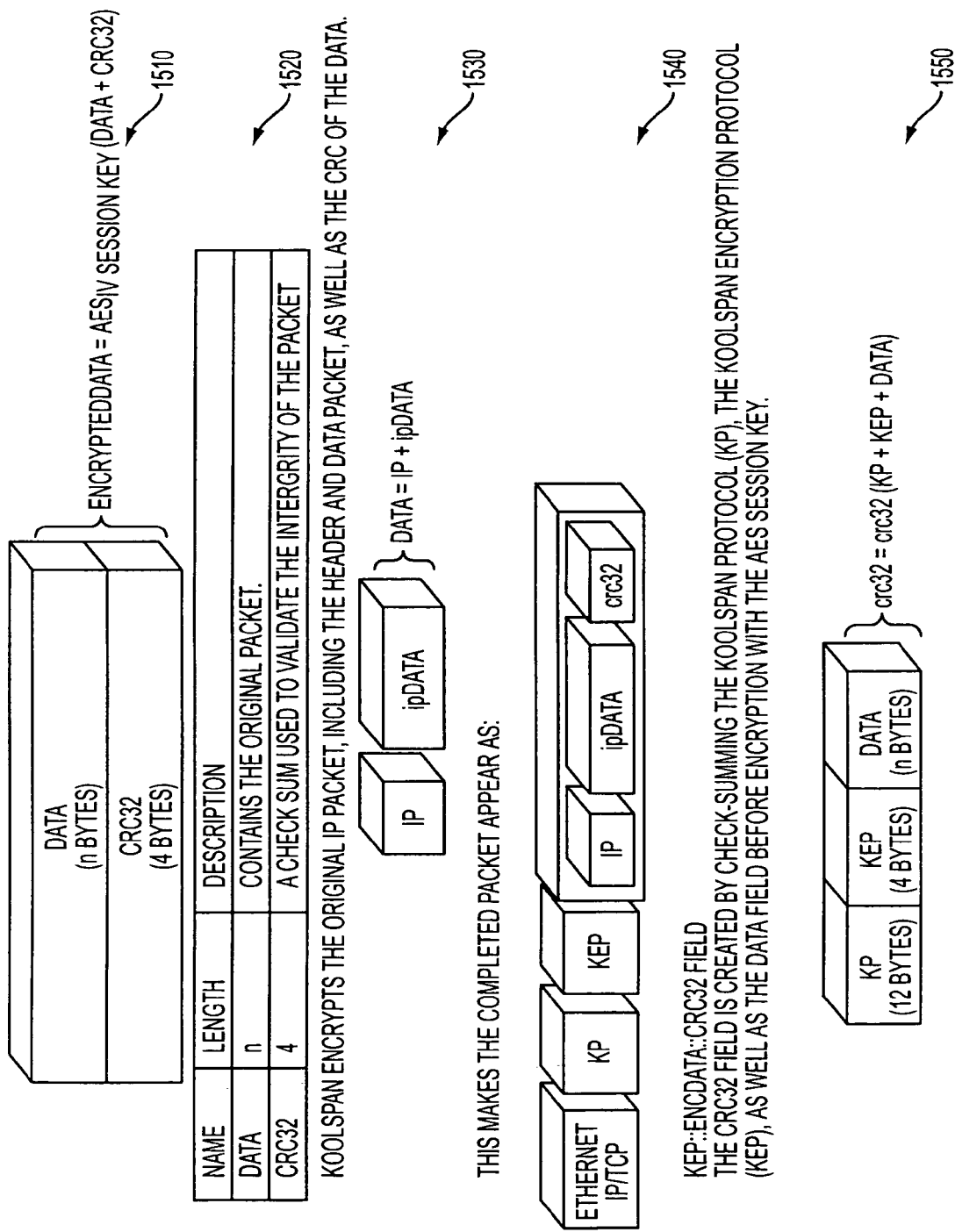
Figure 16:
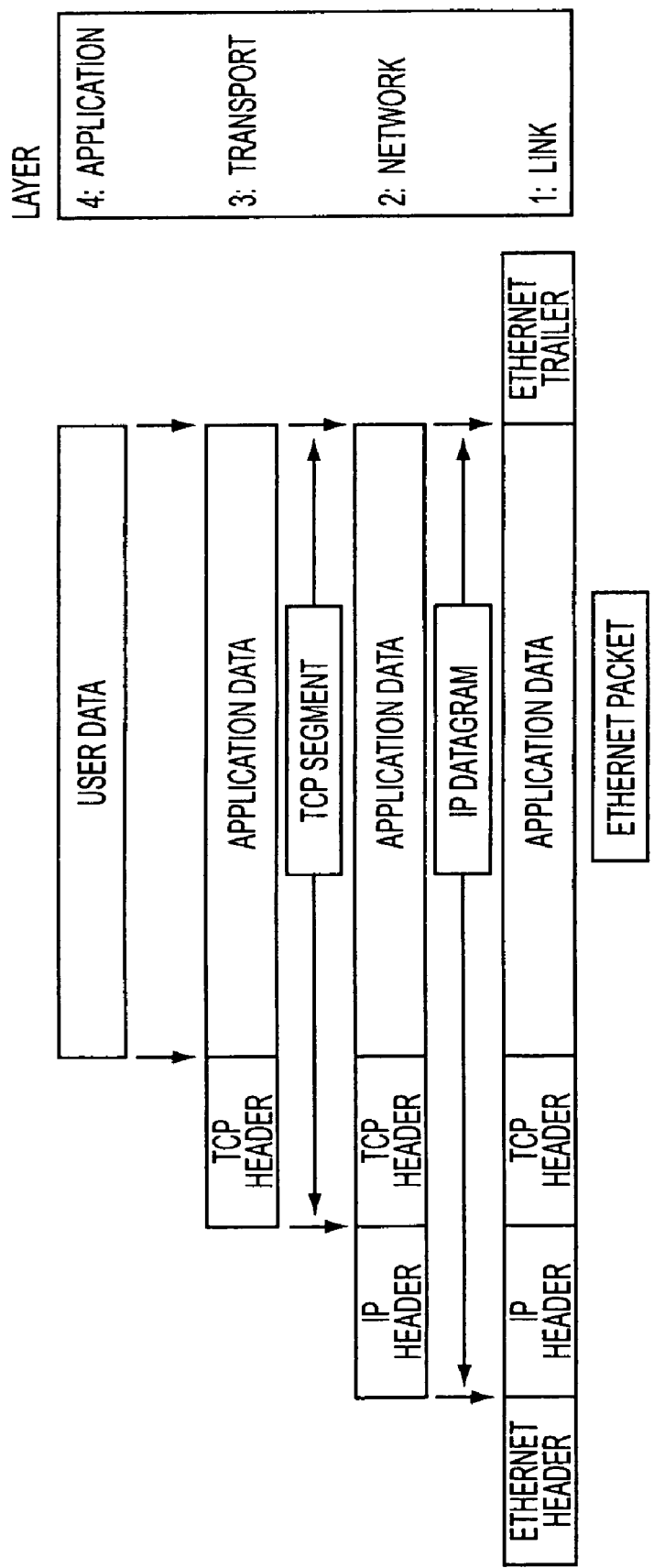
FIG. 16 illustrates a technique for deriving a shared session key according to an embodiment of the invention.

The Client NDIS Intermediate Driver (610) will intercept all outbound packets to the remote network once authentication is complete and an AES Session Key is generated. The packet header (1400) comprises an Ethernet Header (1410), IP Header (1420) and a TCP Header (1430). The IP header (1420) will be examined and if a match is found between the Destination IP Address contained in the IP Header (1420) and an entry in the Remote Connection Table (1300), the packet will be encrypted as shown in FIGS. 14 and 15. As shown in FIG. 16, the encryption of the packet takes place by the NDIS Intermediate Driver (610) at the Network Layer, Layer 2. A Layer 2 solution is transparent to all higher layer protocols and applications (layer 4) and is preferred over VPN methods that are essentially Layer 4 (Application Layer) solutions as a Layer 2 solution is much less susceptible to tampering than is a higher layer solution.

The Client NDIS Intermediate Driver (610) takes the initial IP packet (1530) and encrypts it and a CRC with the AES Session Key (step 1510). The CRC is computed (step 1550) and is a checksum on the KP, KEP and data fields. The packet (1540) comprises the IP address of the remote network Subnet Box (260) and the Koolspan TCP port number that the Subnet Box will automatically recognize as a Koolspan packet. The resulting packet (1540) is then transmitted via ordinary network methods to the remote network Subnet Box (260).

On receipt of an inbound packet, the Cable Modem (195) will pass the packet to the Subnet Box (260). The Subnet Box (260) examines the TCP port header (1430) and recognize that this is a Koolspan data packet. The source IP address contained in the IP Header (1420) and the source Port Number contained in the TCP Header (1430) will be compared against entries in the Remote Client Connection Table (1020). If the packet contains a Protocol Header (1440) followed by an Encryption Header (1460), the matching AES Session Key (1030) is retrieved from the Remote Client Connection Table (10920) and used to decrypt the encrypted data (1470). As shown in FIG. 15, the CRC will be computed on the KP (1440), KEP (1460) and data fields (step 1550), and compared against the decrypted CRC contained within the encrypted packet (1540). If a match is found, a new packet will be constructed containing the extracted, original IP header and decrypted data and will then be passed onto the Corporate LAN unencrypted via the Subnet Box network port (510).

The Subnet Box (260) can thus enable multiple secure remote client connections simultaneously. The Client NDIS Intermediate driver (610) can similarly maintain multiple secure remote connections to multiple networks simultaneously.

Other embodiments and uses of the invention will be apparent to those skilled in the art from consideration of the specification and practice of the invention disclosed herein. Although the invention has been particularly shown and described with reference to several preferred embodiments thereof, it will be understood by those skilled in the art that various changes in form and details may be made therein without departing from the spirit and scope of the invention as defined in the appended claims.

The invention claimed is:

1. An automatic hardware-enabled virtual private network system comprising:
a first token, wherein said first token is configured to be coupled to a computing device;
a subnet box configured to be coupled to a private network and to a public network, wherein the subnet box is configured to communicate with the computing device via the public network;
a second token, wherein said second token is configured to be coupled to said subnet box;
wherein said virtual private network is facilitated only when said second token is coupled to said subnet box; and
a key database, wherein said key database is coupled to said subnet box and comprises a serial number and at least one secret cryptographic key associated with said first token;
whereby the subnet box facilitates an encrypted connection between the subnet box and the computing device when the first token is coupled to the computing device.

2. The system of claim 1, wherein said subnet box further comprises a dynamic host configuration protocol server.

3. The system of claim 1, wherein said first token comprises said serial number and said secret cryptographic key.

4. The system of claim 1, wherein said subnet box can authenticate said first token.

5. The method of claim 1, wherein each serial number is unique to the first token of the computing device.

6. A method of establishing a secure communications tunnel, the method comprising the steps of:
authenticating a remote client to a subnet box on a private network, wherein said remote client is connected to said subnet box via a public network,
establishing a tunnel between said remote client and said subnet box when a first unique physical token is coupled to said remote client and a second unique physical token is coupled to said subnet box, and
encapsulating all traffic in said tunnel,
wherein said subnet box is coupled to a key database that comprises a serial number and at least one secret cryptographic key associated with said first unique physical token.

7. The method of claim 6, wherein said first unique physical token comprises a smartcard.

8. The method of claim 7, wherein said first unique physical token is configured to be inserted into a communications port of said remote client.

9. The method of claim 6, wherein said step of authenticating comprises the steps of:

receiving an authentication packet, wherein said first authentication packet comprises an identifier identifying said first unique physical token and a first random number, and transmitting a response authentication packet, wherein said response authentication packet comprise a second random number.

10. The method of claim 9, wherein said step of establishing a secure communications tunnel comprises the step of generating a cryptographic key based on said first and second random numbers.

11. The method of claim 6, wherein each serial number is unique to the first unique physical token of the remote client.

* * * * *